US006884508B2

(12) United States Patent
Grönroos

(10) Patent No.: US 6,884,508 B2
(45) Date of Patent: Apr. 26, 2005

(54) PIGMENT COMPOSITE AND METHOD FOR THE PREPARATION THEREOF

(75) Inventor: Lars Grönroos, Tampere (FI)

(73) Assignee: Timson Oy, Espoo (FI)

( * ) Notice: Subject to any disclaimer, the term of this patent is extended or adjusted under 35 U.S.C. 154(b) by 0 days.

(21) Appl. No.: 10/257,761

(22) PCT Filed: Apr. 18, 2001

(86) PCT No.: PCT/FI01/00381
§ 371 (c)(1),
(2), (4) Date: Jan. 14, 2003

(87) PCT Pub. No.: WO01/79606
PCT Pub. Date: Oct. 25, 2001

(65) Prior Publication Data
US 2004/0202835 A1 Oct. 14, 2004

(51) Int. Cl.⁷ ................................................ B32B 5/16
(52) U.S. Cl. ...................... 428/403; 428/404; 428/406; 428/407; 106/460
(58) Field of Search ................................ 428/403, 404, 428/406, 407; 106/460

(56) References Cited

U.S. PATENT DOCUMENTS 3,669,899 A  *  6/1972  Vassiliades et al. ....  428/402.24
4,058,434 A  * 11/1977  Vincent et al. .............  162/165
5,236,989 A     8/1993  Brown et al.
5,882,395 A  *  3/1999  Linde et al. ................  106/460
6,063,180 A     5/2000  Korschen et al.

FOREIGN PATENT DOCUMENTS

GB    1 392 923 A    5/1975

OTHER PUBLICATIONS

WPI/Derwent's abstract, accession no. 1990–338205, week 9045, Abstract of JP 2242998, (Asada Siefun KK, Miyoshi Kasei YG) Sep. 27, 1990.

* cited by examiner

Primary Examiner—Leszek Kiliman
(74) Attorney, Agent, or Firm—Baker & Daniels

(57) ABSTRACT

The invention relates to a coating element, a coated fibrous web, and methods for manufacturing the same. The invention also relates to a particle granule. The coating element comprises a pigment binder structure granule formed from pigment particles and a binding agent and, possibly, additives, the pigment particles being bound to one another through a binding agent. According to the invention, the shape of the granule is essentially rotationally symmetrical, comprising an inner part and a crust part, the density of the inner part being lower than the crust part. The granules can be prepared by spray drying from aqueous slurry that contains a pigment, binder, and possible additives. The shape of the coating elements can be altered by using controlled deformation. They can be flattened, for example, by calendering to form the surface of a desired shape, and attached to the surface of the fibrous web without a separate binder or by adding a small amount of binder only.

32 Claims, 7 Drawing Sheets

PIGMENT COMPOSITE AND METHOD FOR THE PREPARATION THEREOF

Figure 1:
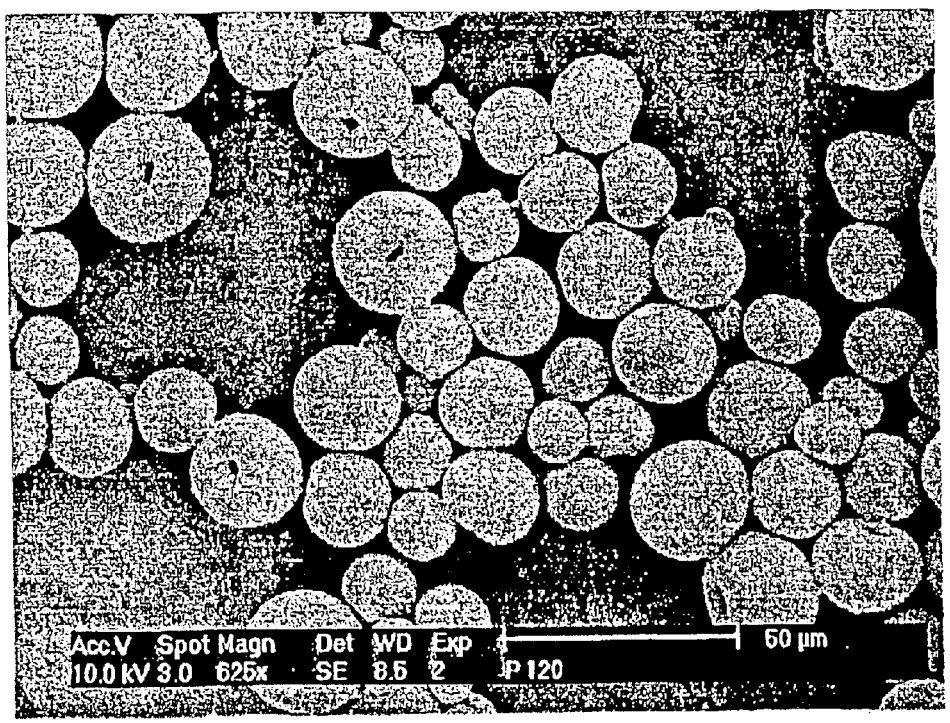

This application is the national phase under 35 U.S.C. § 371 of PCT International Application No. PCT/FI01/00381 which has an International filing date of Apr. 18, 2001, which designated the United States of America.

The present invention relates to the coating of fibrous webs, such as paper and cardboard. In particular, the invention relates to a coating element according to the preamble of claim 1, which can be used for coating of paper, cardboard, and similar fibrous webs.

Such a coating element comprises pigment particles that are bound to one another through a binding agent, forming a pigment binder structural granule. In addition to the binding agent and the pigments, the structure possibly contains additives.

The invention also relates to a method according to the preamble of claim 11 for manufacturing the coating element.

The method comprises forming from pigment particles, a binding agent, and additives, if any, a mixture, which is dried.

The invention also relates to a coated fibrous web according to the preamble of claim 16 and a method according to the preamble of claim 22 for coating the fibrous web.

Another object of the invention is a granular pigment according to the preamble of claim 27. Such a granule comprises a granular structure made of plate-like mineral particles and binding agents. The granular structure can be used, for example, for coating paper webs or filling the spaces between the fibres of a fibrous web (filler use). The granule can also be used as a porous component in other matrices, such as thermoplastics, elastomers or resins. It can also be used in the intermediate layers of various coatings to provide special properties.

Several, partly contradictory, objectives are related to paper coating. Thus, coating aims at, e.g., providing a coated surface with as good properties as possible, such as good brightness, gloss, and opacity. The surface should also have good mechanical properties, such as good smoothness and a high dry and wet strength. Important properties for printing purposes further include ink absorption and setting.

New digital printing methods make new demands on paper. The ink jet method requires that the solvent phase of the ink is quickly absorbed by the surface of the paper and, in electrophotography, a useful printing surface must have the capability to receive and deliver electric charges, i.e., the surface must have good resistivity.

To accomplish these goals, a coating colour suitable for the particular application is spread on the surface of the paper web. The coating colour generally contains a mineral component (pigment), and an organic binder which is present in dissolved or emulgated form. Further, the coating colour contains numerous additives, the purpose of which is either to facilitate the coating process or give the coating a functional property.

In some cases, a granule formed by the particles of one or more pigment grades is used as the pigment part of the coating. Such a particle is known as a structured pigment. To bind the particles to each other, various natural bonding forces between the particles, thermal methods (sintering, calcination), or separate inorganic or organic binders can be used. These structured agglomerates are used as part of the coating colour, which also contains a binding agent. These agglomerates are mainly rigid structures, which cannot be deformed in a controlled way.

When the intention is to achieve high brightness of the coated surface, generally a pigment or a pigment combination is selected that already has high brightness. Such pigments are commercially available, their price generally being the higher, the higher the brightness or opacity can be achieved by using them. The price level of the pigments naturally also varies according to how much they have been processed. Thus, for example, pigments whose particle size distribution has been treated to be more advantageous (e.g., a steeper distribution) are generally more expensive than products that have not been processed as much.

The intention is to make the coating of the fibrous web (such as paper) as untransparent, i.e., opaque as possible by using as thin a coating layer as possible. In addition to the properties of the pigment, the structure of the coating formed from them, the binder used and, especially, the air pores occurring in the coating affect the opacity of the coating.

When a pigment or pigment agglomerate having a low density is used, an opaque coating can be provided with the aid of a layer, the weight per unit area of which is low but the volume per unit area (i.e., the thickness of the coating) adequate.

The thicker the coating layer applied onto the web, the better the properties of the coated base paper are covered in connection with coating. Because, the thickness of the coating layer provided by single application is limited by the method used, and the chemical components of the coating colour are expensive and evaporation of the water contained by the mixture expensive, the thickness of the coating is generally optimised so that desired coverage and degree of properties are achieved. To this end, it might be necessary to coat the paper once, twice or even three times.

A coating of an especially high quality (e.g., art printing papers) is provided by coating the fibrous web several times and drying the coated surface between the coating stages. In that case, the smoothing of the web surface (base coating) is first generally carried out by using a coating that contains a coarser pigment, and the surface coating by using a finer pigment.

As apparent from the above, the solutions according to prior art are characterized in that to provide high-quality coating, highly processed or expensive pigments must be used, which are applied onto the surface of the paper in several stages of coating. The water in the coating colour must be evaporated after each layer of coating to dry the coating, whereby evaporation of the water constitutes a critical limit to the speed of the coating process. In multi-layer coatings, various pigments must mostly be used to provide a sufficiently smooth surface.

It should further be pointed out that when massive particles are used as fillers or as coating pigments of the fibrous web, there is a particular problem in that the weight of the filled or coated product increases, because the density of the massive particle is high. This fact may have adverse effects on the use or the cost-effectiveness of the product. If the same properties could be provided by a pigment with a lower density, it would be of great economic benefit.

The rheology of plate-like particles sets certain restrictions on the use of these particles. When the aspect ratio of the particles increases, the maximum dry content of the aqueous slurry remains on a lower level. Such slurries have dilatant properties, which are harmful for the coating process.

The porosity of the coating layer has an essential effect on the optical properties of the layer. The air pores that remain in the gaps between the particles and the matrix behave in an opaque way, whereby the transmission of light decreases. This is a property worth aiming at for paper webs in particular. From the point of view of the optical and printing properties of the coating it would be preferable, if the finest part of the particle distribution remained on the surface layer of the coating and formed a smooth, fine-grained underlayer for printing. A coarser portion, for its part, would make the coating layer bulky. In practice, such distribution hardly ever occurs without special arrangements, which is why the said optimal coating structure is at present provided by coating the web twice; first, with a coarser pigment and, finally, with a finer pigment. This increases both investments and operating expenses.

It has been observed that, when plate-like particles are used in the coating of fibrous webs, and the coating method used comprises the blade coating methods generally available, the plate-like particles under the blade are mainly oriented in the direction of the web. Thus, essentially no considerable number of air pores is formed in the gaps between them. Accordingly, to increase the porosity of the coating structure, generally another pigment that is less plate-like is used in coating slips to render the structure more porous.

In connection with the coating process of the fibrous web, the fibres swell under the effect of water contained by the coating, and the surface becomes coarse because of the volume contraction of the coating structure, which is why the coated and dried surface mainly always requires a smoothing treatment (calendering) to provide the final printing surface.

It is an aim of the present invention to eliminate the disadvantages of the prior art and to provide a completely new kind of solution for coating paper and similar fibrous webs.

The invention is based on the idea that the pigment binder structure that forms the surface layer of the coating is made as ready as possible in advance. According to the invention, therefore, a prefabricated coating element is produced, which, when applied on the surface as such or, possibly, with a small amount of additional binding agent, forms the surface of the fibrous web or the printing underlayer after a mechanical treatment. Therefore, a coating element, the composition of which mainly corresponds to the coating layer of the fibrous web is used for coating the fibrous web. The surface layer of the coating element preferably contains more fines than its core part. Thereby, the structure of the surface layer of the coating element mainly corresponds to the structure of the surface layer of the coating made of the coating element.

Such a coating element can be prepared by mixing together the pigment and the binder and by drying the mixture in conditions, wherein a rotationally symmetrical, e.g., a spherical aggregate or structure of pigment and binder is produced. It has been observed that when a pigment feedstock containing different size particles is used for preparing such a structure, internal segregation occurs in connection with the drying of the structure. The inner parts of the rotationally symmetrical granules are formed from essentially coarser particles, and the finest pigment particles accumulate in the surface parts. At the same time, the surface layer becomes dense and the core surface porous.

The coating elements according to the invention can be attached to the surface of the fibrous web as such (dry coating) or together with a small amount of binding agent (wet process), whereby the final surface layer of the fibrous web is provided by exertion of mechanical treatment on the surface coated with the structure elements to flatten the elements to form a solid surface.

After the mechanical treatment, a very smooth surface is obtained, which, in addition to the conventional printing methods, is very well suited to ink jet and electrophotography applications.

In the first preferred application of the invention, it has been found that when a suitable binder and, possibly, other additives are added to the carrier solution of a pigment, such as kaolin that has a plate-like crystal form, and the said mixture is conveyed to a process, wherein drops are formed from it, travelling with a gas flow, whereby the solvent phase contained by the drops evaporates, then granules formed by the particles and the binders are generated in the process. Such conditions are provided in connection with spray drying, for example. The carrier is selected on the basis of the application; generally, water is selected.

When the water in the drops evaporates, it can be observed that the plate-like particles on the surface settle in the direction of the drop, in this way minimizing the surface energy.

The phenomenon is induced by the force caused by the meniscus of the water on the particles. Under the effect of the same force, the surface of the granule also becomes level, providing as rotationally symmetrical, e.g., spherical form as possible. It has been observed that fine-grained particles gravitate onto the surface of the drop, forming its surface layer. On the other hand, the movement caused by the evaporation of water also brings some binding agent onto the surface layer of the drop. After the drop has dried, a granule formed by the particles and the binder is formed from the drop, one feature of the drop comprising the layer on the surface of the granule, formed from the plate-like particles, wherein the levels of the particles are oriented in the direction of the spherical surface. The layer has become concentrated in relation to the binding agent. Furthermore, the granule has a porous middle section formed from plate-like particles that are in disorder, which again has become barren of binding agent.

More specifically, the coating element according to the invention is characterized in that which is presented in the characterizing part of claim 1.

The method according to the invention for preparing coating elements is characterized in that which is presented in the characterizing part of claim 11.

The method according to the invention for coating the fibrous web is characterized in that which is presented in the characterizing part of claim 16 and the coated fibrous web according to the invention is characterized in that which is presented in the characterizing part of claim 22.

The particle granule according to the invention is characterized in that which is presented in the characterizing part of claim 27.

The invention provides considerable advantages. Accordingly, the actions critical for the speed of the coating process can be implemented before coating and completely separately thereof. In the present invention, segregation of the pigments can be provided in connection with the preparation of the particle granules, speeding up the coating process.

The present coating elements are further characterized in that their shape can be altered by controlled deformation. For example, they can be flattened by calendering to form the surface of a desired shape. The coating elements can be attached to the surface of the fibrous web without a separate binder or by adding a small amount of binder only.

The density of the coating elements is, on an average, 60 to 70% of the density of typical pigments. The porosity of the inner parts thereof and the combination of the concentrated fines and the binding agent of the surface part gives an opportunity to provide a coating with a porous inner part and a homogeneous and fine-grained surface layer by using one application. By suitably selecting the pigment, the bulk of the coating can be increased, whereby its opacity increases at the same time.

As the density of the coating element is lower than that of conventional pigments, the volume concentration of the coating is high and, consequently, in connection with application, there is no need to add as large amounts of water onto the surface of the web as when spreading a coating colour, whereby the drying stage requires less energy and is quicker.

The properties of the final surface at large can be directly concluded from the surface of the particle granule. Therefore, the invention can be used to affect the properties of the produced surface in advance by suitably selecting the pigment, the binding agent, and other additives.

The invention is especially applicable to granule pigments consisting of massive pigments. In that case, the advantage is accomplished, among others, that when kaolin with a density of 2.7 $g/cm^3$ is used as the particle and latex with a solids density of 1.0 $g/cm^3$ is used as the binder, for example, when manufacturing the granule, the density of the granule according to the invention is typically only about 60% of it, i.e., 1.6 $g/cm^3$. Accordingly, advantageous size distribution and controlled packing are provided. It is possible to define the optical properties of the granule already in the manufacturing stage.

As the density of the granule is essentially lower than that of the massive particles that comprise its structural elements, we have surprisingly noticed that the said granule can preferably be used as filler having a low density or as the coating of fibrous webs. When used as coating, the binder of the granule should be selected so that plastic deformation is possible in connection with calendering by using pressure and/or temperature.

The granule according to the invention can be used to provide a coating, wherein the surface layer of the granule forms the surface layer of the final coating. The plate-like particles are ready in the direction of the surface and light, smoothing calendering can be used to provide an even underlayer for printing.

The rheology of the spherical granules in an aqueous solution is very good, whereby the volume concentration of the coating slip can be high.

Coarse particles can also be used as the structural material of the granule; the properties of the particles as such would not be applicable for preparing the surface layer of the printing surface but, as they are in the inner parts of the granules, surrounded by fine-grained particles, it is profitable to use them. On the other hand, the very fine-grained, i.e., less than 0.3 μm, portion of the particles can cause drawbacks in conventional coating applications, among others, by filling the spaces between the particles and, thus, decreasing the porosity of the coating. By using the method according to the invention, the said fine-grained particles can be bound to form the surface layer of the granule, whereby partial use thereof is possible without the said disadvantages. Generally speaking, when using the granules, the size distribution of the particles is not as significant as if the pigment was used as part of a conventional coating process.

According to the invention, part of the aqueous phase, which conventionally would be evaporated by the drying section of the coating machine, is evaporated as early as in connection with the manufacturing process of the granule, whereby the equipment of the paper industry that require larger investments can increase their capacity and, on the whole, considerable economic benefits are obtained.

Other features and advantages of the invention will become apparent from the following detailed description and the working embodiment related thereto.

Figure 2:
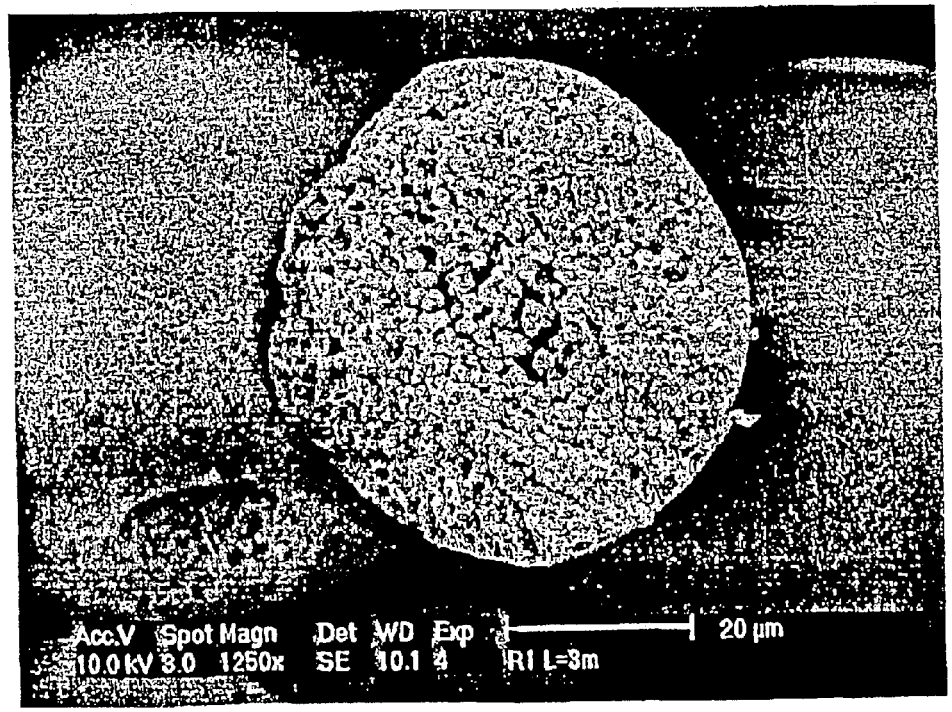
Figure 3:
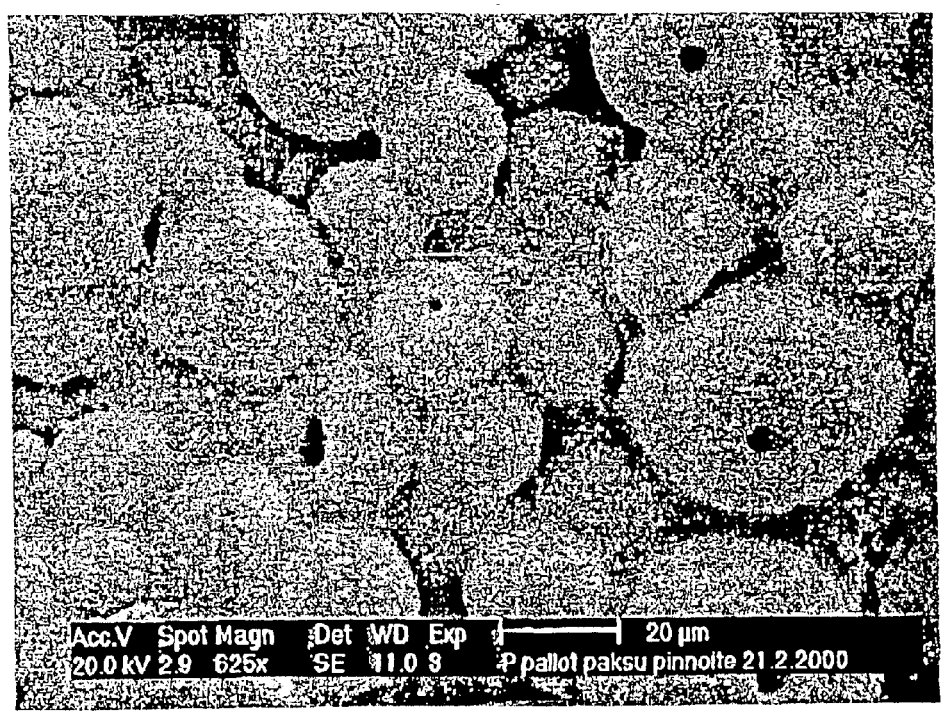
Figure 4:
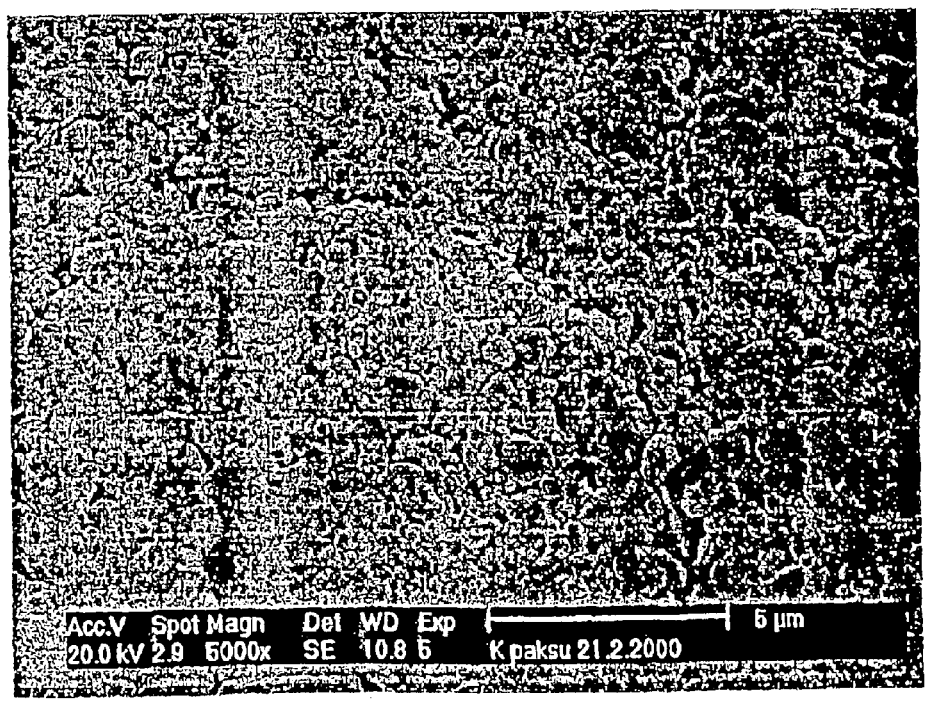
Figure 5:
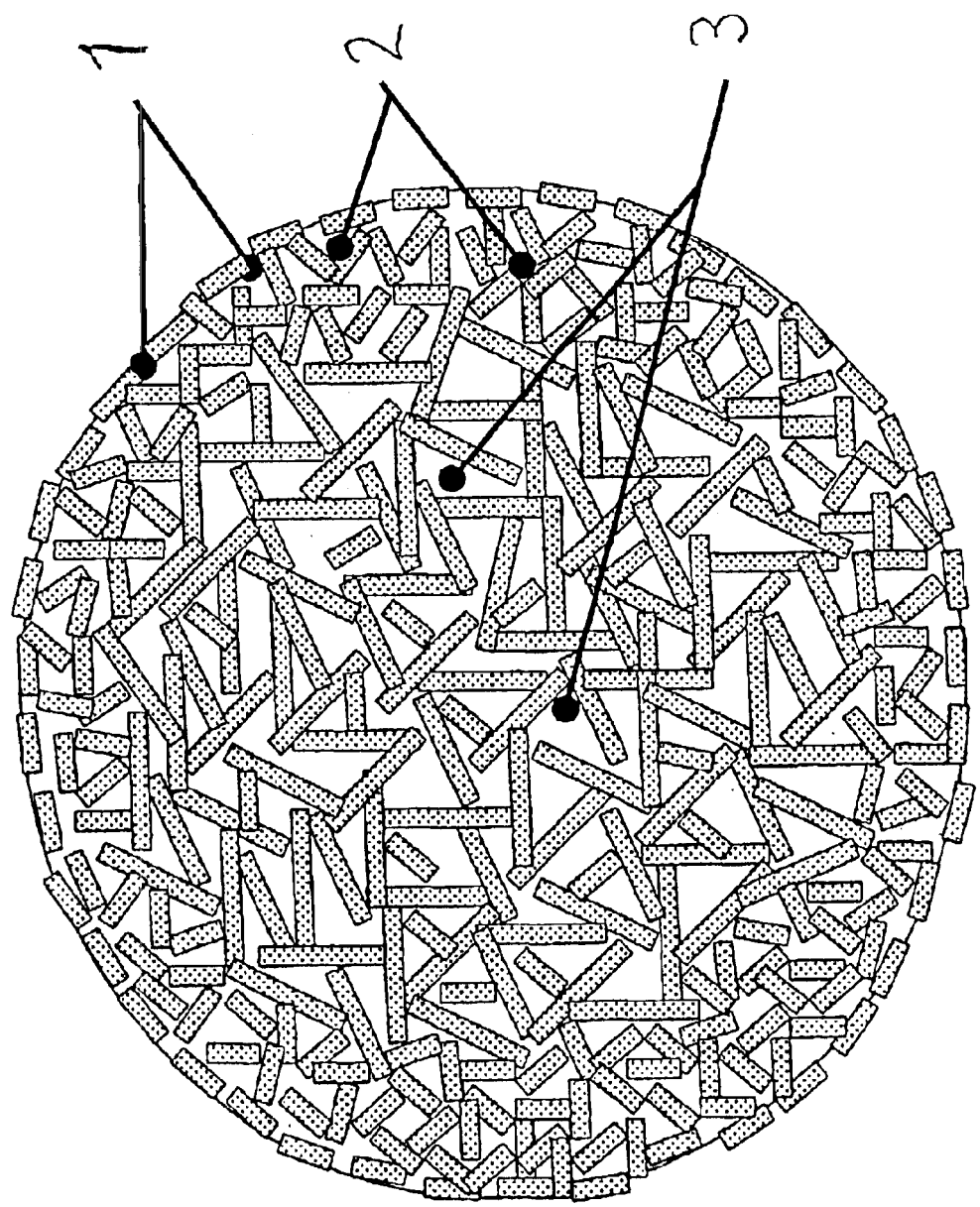
Figure 6:
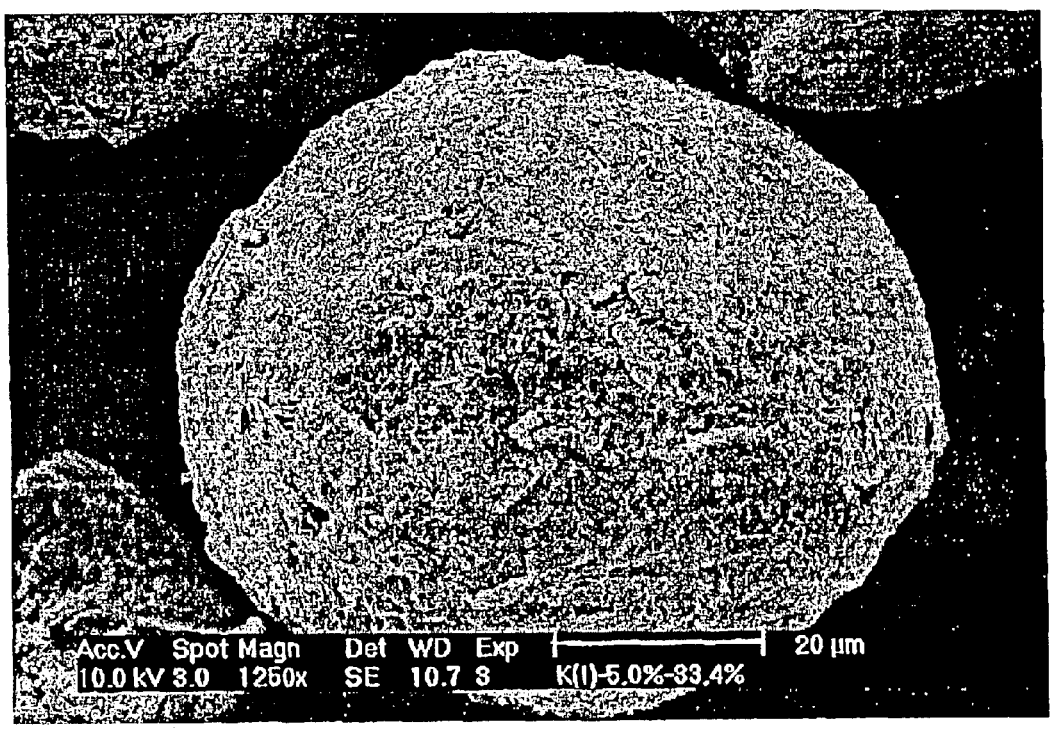
Figure 7:
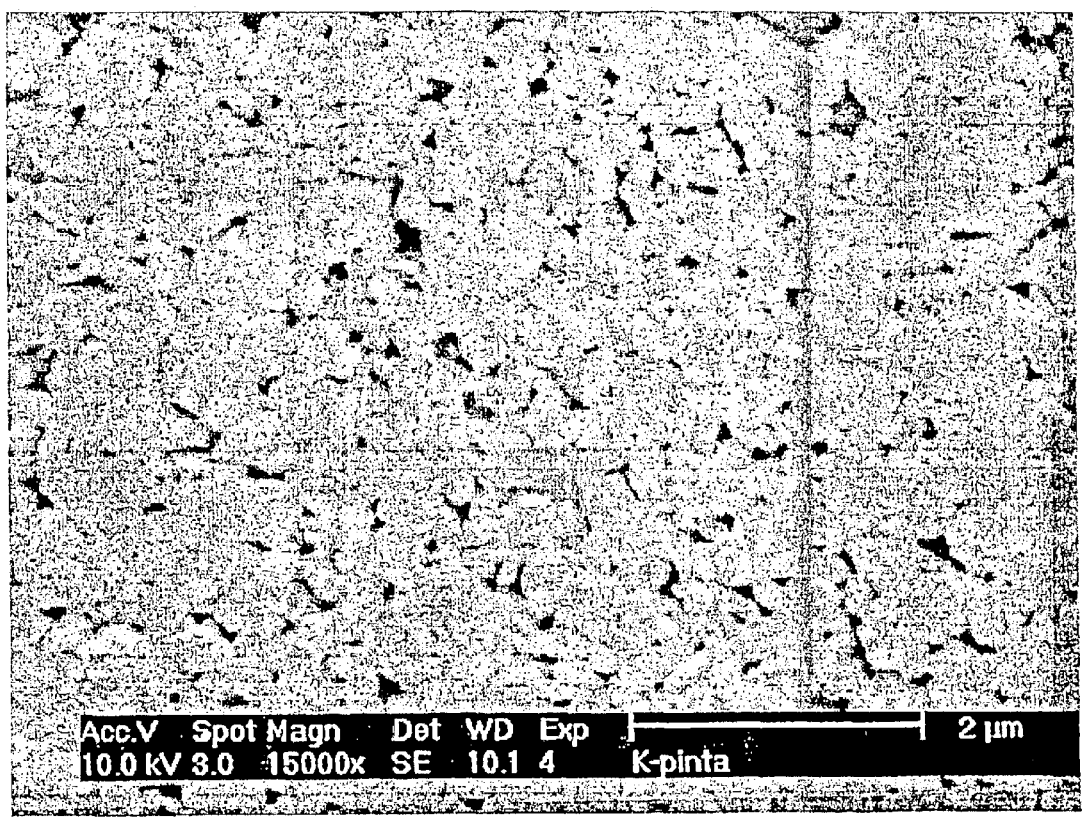
Figure 8:
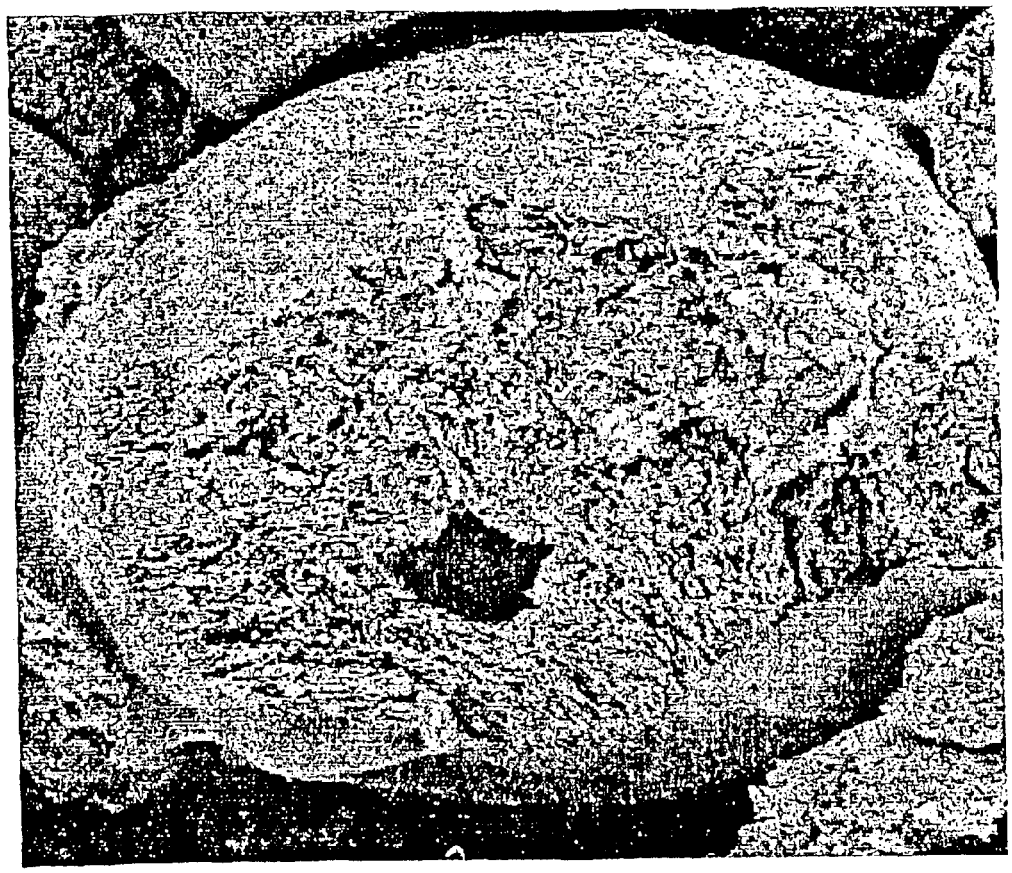
Figure 9:
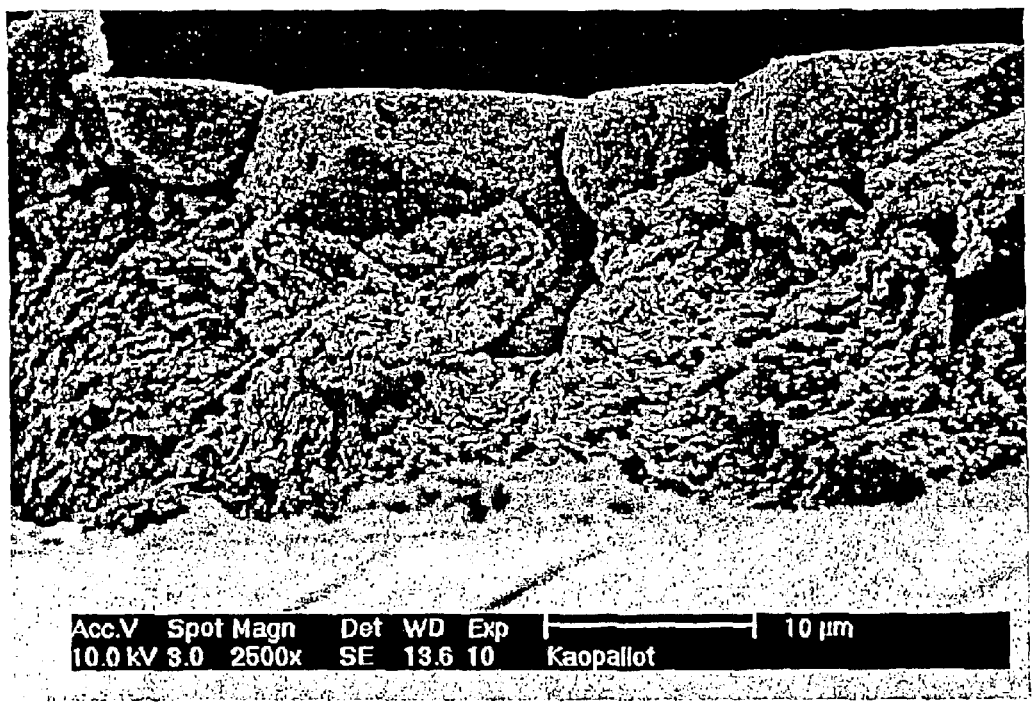

FIG. 1 shows an electron microscopic image of the spherical granule according to the invention, FIG. 2 shows an electron microscopic image of the granule according to the invention when split, FIG. 3 shows an electron microscopic image of the surface of the coated web before further processing, FIG. 4 shows an electron microscopic image of a surface provided by a laboratory calender, wherein the coating elements are flattened and provide a smooth coating layer, FIG. 5 is a diagrammatic presentation of the cross-section of the granule according to the invention, FIG. 6 shows an electron microscopic image of the granule according to the invention, FIG. 7 shows an electron microscopic image of the surface of the granule, FIG. 8 shows an electron microscopic image of the structure of the granule cut in two, and FIG. 9 shows an electron microscopic image of a coating layer formed onto a substrate, containing granules according to the invention.

The present invention uses the terms "pigment binder structure" and "particle granule" as synonyms for one another and they refer to the combination or aggregate formed by the particles, the binder, and possible additives, comprising several interconnected particles. However, all particles of the structure are not necessarily interconnected but the inner part of the structure, which is barren of binding agent, does not always have high mechanical strength.

Generally, the size of the particle granules according to the invention is 1 to 100 μm, preferably about 5 to 20 μm. The size of the coating elements can be regulated by the manufacturing process within the limits permitted by the process. The surface roughness and porosity of the web to be coated affect their optimum size, i.e., the coarser the surface that is coated, the larger the optimum size of the coating element used for the coating.

As shown in FIGS. 1 and 2, the particle granules are round, spherical or, more generally, rotationally symmetrical. Because of their shape, they pack fairly tightly on the surface of the fibrous web, attaching to one another, when mechanical compression is exerted on them, possibly simultaneously heating the surface. The coating process is described in detail below.

The coating element of the invention consists of the following components:
  a pigment
  a binding agent, in particular a synthetic binder in the form of emulsion,
  water
  functional additives that facilitate the process or give special properties to the coating.

Practically, all known pigments commonly used in coating can be used in the invention, e.g., kaolins, ground or precipitated calcium carbonates, titanium dioxide or silicate-based pigments.

Various synthetic binding agents in the form of emulsion can preferably be used as the binding agent, e.g., styrene butadiene latex or polyvinyl acetate polyacrylate-based latexes; however, not limiting to the above-mentioned examples only. The softening temperature of the latex is adapted to the smoothening of the surface carried out after the application so that the desired deformation of the coating elements can take place.

The additives possibly used can, for example, improve the rheology of the coating colour or change its surface tension, or give the final coating special properties, such as surface strength, electrical conductivity, or affect the absorption of black. The use of additives is not limited to the above-mentioned examples only but commonly used functional additives of the coating can be used in the method.

The spherical or otherwise rotationally symmetrical particle granules are produced by drying the aqueous slurry formed from the binding agent, the pigment, and possible additives. In that case, the above-mentioned components are first mixed together by intensive agitation to provide as homogeneous a mixture or suspension/dispersion as possible.

The aqueous slurry is preferably dried in the air and some other gas. The dry content of the aqueous slurry before drying can be about 30 to 95% by weight.

Producing the granules by the spray drying technique is an example of the drying technique used in the invention. This technique is based on technology known per se. The process variables of the spray drying comprise:

device construction nozzle structure feed pressure methods that decrease the surface tension of the mixture dry content of the mixture before drying other methods that affect the size of the drop, such as the use of ultrasound.

It should be noted that, in contrast to the known solutions, the adjustment of the shape and size of the granules is preferably carried out by adjusting the variables that regulate the drop formation by using the feeding method, among others, and the drying rate is regulated with the aid of the air temperature and turbulence.

With regard to the drying technique, the spray drying is especially well suited to the manufacture of the granules according to the invention but, as is obvious to those skilled in the art, the drying methods are not limited to the spray drying only, but other types of drying techniques can also be considered, as long as they can be used to produce the said granules. In drying, it is essential that very fine-grained drops can be formed, which dry apart from one another. The size range of the drops should correspond to the size of the desired pigment granules. Generally, the size of the drops is thus about 1.1 to 5 times the size of the granules; typically, the size of the drop is about 1 to 300 $\mu$m, preferably 5 to 100 $\mu$m, more preferably 50 $\mu$m maximum.

The feedstock pigments used in the invention consist of products that contain different size particles. Thus, segregation of pigments takes place inside the particle granules formed during drying. An inner part and a surrounding crust part are formed. The thickness of the crust part in the direction of the radius of the spherical structure is generally about 0.1 to 5%, preferably 0.1 to 10%, typically 0.5 to 2% of the radius of the granule.

As the inner part contains a greater number of coarse particles than the crust part, the density of the inner part of the pigment binder structure is lower than the crust part. Generally, the density of the inner part is about 10 to 90%, preferably about 40 to 80% of the density of the crust part. Accordingly, as an example it can be mentioned that when the particle granule is formed from pigment particles with a density of about 2,400 to 3,100 kg/m$^3$, the density of the inner part is about 1,100 to 1,500 kg/m$^3$, and that of the crust part about 1,700 to 2,000 kg/m$^3$. Normally, the inner part of the pigment binder structure then contains coarser pigment particles in relation to the crust part. The porosity of the inner part is also higher than that of the crust part, its pore volume normally being about 10 to 50% by volume, preferably about 30 to 40%.

The inner part of the particle granules contains less binding agent than the surface part. Generally, there are about 55 to 95% by weight of the total amount of binder of the particle granules in the crust or the surface part of the granules.

The particle granule contains about 1 to 30 weight fractions, preferably about 2 to 20 weight fractions of binding agent per 100 weight fractions of pigment particles. The crust layer now comprises fine-grained pigment particles, which are bound to one another through a cross-linked binder, forming a fine-grained and flexible film that surrounds the inner part.

FIG. 1 shows an electron microscopic image of the typically spherical granule according to the invention. Its form or size is not essentially dependent on the pigment used. FIG. 2 shows a corresponding presentation of the spherical granule when split, whereby it can be observed that its inner parts consist of larger particles and its porosity is higher than that of the surface layer of the granule.

If a pigment, such as kaolin, is used, which has a plate-like crystal structure, the crystals settle on the surface of the spherical granule mainly in the direction of the surface. This can be understood so that the energy engaged by the boundary layer of the liquid gas phases is a variable that occurs as the function of the orientation angle of the structural units, in this case, the kaolin particles dispersed in liquid, so that when the orientation angle increases, the phase boundary energy increases, when it produces more of the boundary layer. As a consequence, the plate-like kaolin particles tend to minimize the phase boundary layer by adjusting their levels in the direction of the surface of the liquid drop, whereby the phase boundary energy is at its minimum. When particles which are less plate-like are used, the phase boundary energy is also minimized, but its effect on the surface structure is more difficult to notice.

The said spherical granules can be used as coating elements in coating the fibrous web. When the said coating elements are applied onto the surface of the web, the concentrated binder on the surface of the elements facilitates the attachment thereof.

Even though the coating elements can be applied onto the surface of the web to be coated as such (dry coating), the adhesion of the coating elements to one another and to the substrate to be coated can further be improved by adding a separate binder, such as latex, with the coating elements. However, the amount of binder is essentially smaller than the amount of binder that is needed in the conventional coating colour.

The coating layer thus formed can be treated after the application by using pressure and/or temperature, whereby the coating elements are deformed and flattened, forming a smooth layer. If a layer of the thickness of one element granule is formed onto the surface, the fine material on the surface of the elements constitutes the surface layer of the treated surface, and the porous middle part of the elements constitutes the middle part of the coating layer. In this way, surprisingly, a coating is provided, which has an optimum overall structure and which earlier required several applications.

The linear pressure caused by the nip between rotating rolls is preferably exerted on the web that is coated with the coating element that has the pigment binder structure. The pressure is preferably selected so that it is sufficient for flattening the elements but does not cause an essential decrease in the bulk of the fibrous structure of the web. The nip that induces the pressure is formed from two rolls, of which at least one is heated. The nip pressure in calendering can preferably be about 150 kN/m maximum, typically about 50 to 140 kN/m; more preferably about 60 to 100 kN/m.

The invention can be used to coat various fibrous webs, especially those made of lignocellulose-containing raw materials. These include paper and board webs, which are manufactured from mechanical, chemi-mechanical and/or chemical pulp.

After coating, a microcellular structure has been formed on the surface of the fibrous web, comprising interconnected, flattened granules formed from the coating elements, the film-like outer layers of the granules being adhered to one another, forming a solid and smooth surface. The size of the cells in the direction of the fibrous web level is about 1 to 200 $\mu$m, typically about 5 to 20 $\mu$m.

The coating can have only one granule cell layer. In practice, the number of layers is 1 to 10.

Due to the invention, the importance of the particle size distribution of the pigments is decreased, as because of the internal segregation of the granule, primarily only the properties of the fine material accumulated on the surface have an effect on the properties of the coating surface.

As only the fine fraction of the surface layer has a considerable effect on the final brightness of the coating surface, the significance of the brightness of the pigment used in the coating elements also decreases, when a mixture of several pigments is used, at least regarding the coarser fraction thereof. Because of the high porosity of the coating, the desired opacity can be provided by a smaller amount of coating (measured by weight) and the diffuse reflectance of the coating is also improved because of the porosity. The significance of the brightness of the fibrous web that is coated also decreases because of the better opacity of the coating.

In a conventional coating method that uses a quickly immobilizing coating colour, a quickly locking particle structure is provided, after which the water is evaporated from the coating. In that case, the advantage of low shrinkage of the coating is provided, among others. The coating structure is fairly homogeneous in the direction perpendicular to the web surface. If a surface consisting of fine-grained particles in particular is to be provided, it is preferable to carry out multi-layer coating, whereby coating elements formed from the pigment binder structures, comprising especially fine-grained particles in the film layer thereof, are used for the last coating layer.

As the coating according to the invention can be used to provide the coating with even better properties than that provided by the conventional multi-layer coating, the invention provides considerable economic benefits.

In the following example, the manufacture of the coating element by the spray drying technique is described in detail.

EXAMPLE 1

A pigment and the latex that was used as a binder were mixed with one another by using an effective agitator in a relation, where the portion of the dry matter of the latex from the dry matter of the pigment is 10 fractions. The dry content of the pigment slurry was 70% and that of the latex 50%.

The mixture was fed into a spray drier, the feed pressure of its atomizer being adjusted so that the drop size corresponded to the size of 5 to 10 $\mu$m of a dried particle. According to the information from literature, the formation time of the drop is about 5 ms, during which time a film is formed onto the surface of the drop. The water inside the drop begins to evaporate into the ambient air, carrying with it the binder and the fine-grained pigment particles. In that case, the inner parts of the spherical granules get barren of binder and a porous volume composed of coarser particles is formed in it (FIG. 1). The density of the particle was in the range of 1,300 to 2,000 kg/m$^3$ depending on the mixture ratios and the degree of porosity, whereas the density of the original pigment was 2,700 kg/m$^3$.

The prepared coating elements behaved like a dry powder; the friction between the particles was very small (FIG. 1). A coating colour was prepared from the said particles and binder. The amount of binder used was smaller than that which is generally used in connection with pigments, because the binder contained by the coating elements increased their adhesion to the surface to be coated and to one another. If a typical coating colour generally contains 10 to 12 dry weight fractions (calculated from the weight of the pigments in the slip) of latex, the portion of the binder in the method according to the invention could be decreased to 5 dry weight fractions, for example, but smaller amounts of binder than this are also possible. As the spherical shape of the coating elements gave good flow properties to the mixture prepared from them, it was possible to increase the dry content of the slip higher than that of conventional coating colours.

The coating colour was applied onto the surface to be coated by using conventional coating methods. In laboratory conditions, it was possible to apply the coating by using a paper sheet and a rod coater.

The coated web was dried by conventional methods. The consumption of drying energy was smaller than normally because of the smaller than normal amount of water in the slip. FIG. 3 shows an image of the surface of the coated web before further processing.

The coated web was directed to treatment in a calender, wherein the surface of the web was treated in a roll nip under the effect of heat and pressure. The compression pressure needed is moderate (less than 100 kN/m), whereby it was possible to carry out the calendering by the so-called soft calenders that are commonly used. FIG. 4 shows a surface made by the laboratory calender, wherein the coating elements are flattened and provide a smooth coating surface.

The porosity of the coating was high, i.e., its density was lower than that of the coatings commonly used. When comparing the optical values of the coated paper with a conventional coating made by the same pigment, it could be observed that the opacity, the brightness, and the light scattering coefficient of the coating provided by the coating elements according to the invention are higher.

EXAMPLE 2

As stated above, the particle granule according to the preferred embodiment of the invention consists of plate-like pigment particles and a binder. These plate-like particles have at least one planar surface; mostly there are several planar surfaces. The invention uses plate-like pigments in particular, as described in detail below. The surface layer of the granule provided according to the invention consists of a layer that comprises at least one layer of pigment particles, which at least mainly have settled so that their level is in the direction of the granule surface, and the levels of the pigment particles are almost on the same level. Regarding the rotationally symmetrical granules, the "direction" of the granule surface refers to the tangential direction of the surface. The majority of the pigments, i.e., at least 50%, preferably at least 70%, and more preferably at least 90% are located on the surface of the granule so that the planar surface of the long side thereof is in the direction of the granule surface.

FIG. 5 shows a diagrammatic presentation of the granule structure. Reference numeral 1 refers to the plate-like particles that are formed in the direction of the surface. Reference numeral 2 refers to the surface part with pores, where there are concentrated additives and a fine particle fraction. Reference numeral 3 refers to the porous middle part, where the particles are in a random orientation.

The portion of the binder in the inner part of the granule is smaller than in its surface part. Typically, the portion of the binder in the inner part is about 0.5 to 3 weight-% of the amount of pigment, preferably about 1%. The binder is concentrated on the surface part of the granule, where the amount of binder is 6 to 60 weight-% of the weight of the pigment, preferably about 50%.

The granules can be prepared from a slurry, where the amount of plate-like particle raw material is typically less than 50 percent by volume; however, more generally 20 to 30 volume percent. The raw material is selected according to the use, for example, pigments with a high brightness degree, such as kaolin or lime, are used for coating the fibrous web. Other plate-like raw material, such as mica, graphite or the like can be considered for other purposes of use. The slurry also contains a binder that dissolves in the carrier used or is in the form of a dispersion and, when needed, a dispersing agent. Commonly used latexes, such as styrene butadiene latexes or acrylic or vinyl acetate copolymer latexes, are suitable to be used as a binder in most applications. Typically, the micelle size of the organic phase of such latexes is 0.1 to 0.2 $\mu$m. The dry content and the binder content of the slurry affect the structure of the generated granules.

Water in particular is used as a medium. However, special applications can use organic solvents or mixtures of water and organic solvents. Alcohol, such as ethanol and n- and isopropanol can be mentioned as examples of these organic solvents.

The dimensions of the granule and the plate-like particle used in it have a certain optimum. It must be possible for the granules to settle onto the surface of the granule, whereby a suitable maximum dimension of the particle level is less than 0.1 times the diameter of the generated granule.

The granules can be prepared by using a spray drier, the operational parameters of which can be used to adjust the size and the structure of the granule that is formed. The average size of the granules for the driers commonly used is always less than 1 mm, more generally 2 to 500 $\mu$m. The size of the granule suitable for coating applications is 10 to 50 $\mu$m, whereby both the commonly used coating kaolins with a particle size distribution of 98% <2$\mu$m or a coarser product or, alternatively, a finer product than this can be used as its structural parts. 60% <5 $\mu$m minimum is especially preferable in the size distribution of the plate-like particles, 95% <1 $\mu$m maximum.

The method also makes it possible to use mixtures of particles having different distributions.

Drying of the granule is takes place in three steps:
1. The liquid membrane, which at the beginning either fully or almost fully covers the surface, evaporates until the particles emerge.
2. The liquid continues to evaporate from the area between the particles, the granule shrinks under the effect of surface tension forces; the particles displace water from the inner parts of the granule and the water flows towards the surface.
3. The particles no longer have room to shrink; the liquid front withdraws into the gaps between the particles, and the rest of the water exits by evaporation from the inner parts of the granule.

The plate-like particles minimize their free surface energy by directing their levels in the direction of the spherical granule surface. The average size of the particles that form the surface is smaller than that in the granule as a whole. This is due to the fact that it is easier for the small particles to turn in the direction of the surface and that, in the second drying stage, the water transferring to the surface conveys small particles to the surface from between the large ones.

It is also possible to manufacture the granules by using other drying methods, in which the drop can freely dry and form the granule structure according to the invention.

In the example, aqueous slurry with a dry content of 33.4% was prepared from commercial filler kaolin (Intramax, supplied by Imerys Minerals). 5 weight-% of vinyl acetate acrylate copolymer latex (Acronal, supplied by BASF) were added to the slurry to work as a binder. The mixture was run into a pilot spray drier. FIG. 6 shows the generated granule, the diameter of which is 60 . . . 70 $\mu$m. FIG. 7, depicting the granule surface, shows that a large part of the surface consists of particles with a size of <2 $\mu$m.

The structure of the split pigment granule is shown in FIG. 8 that corresponds to the presentation in principle of FIG. 5.

The granule according to the invention deforms plastically under the effect of pressure and/or temperature, which is shown in FIG. 9 that presents the structure of a granule layer spread onto a glass surface after calendering.

What is claimed is:

1. A coating element comprising a pigment binder structure granule formed from pigment particles and a binder and additives, characterized in that the granule has an essentially rotationally symmetrical shape and it has an inner part and a crust part, the density of the inner part being about 10 to 90% of the density of the crust part.

2. The coating element according to claim 1, characterized in that the density of the inner part of the particle granule is about 40 to 80% of the density of the crust part.

3. The coating element according to claim 2, characterized in that the particle granule consists of pigment particles, the density of which is about 2.4 to 3.1 kg/m3, whereby the density of the inner part is about 1.1 to 1.5 kg/m3, and that of the crust part about 1.7 to 2.0 kg/m3.

4. The coating element according to claim 1, characterized in that the inner part of the particle granule contains coarser pigment particles in relation to the crust part.

5. The coating element according to claim 1, characterized in that the porosity of the inner part of the particle granule is higher than that of the crust part, the pore volume of the inner part being 10 to 50% by volume.

6. The coating element according to claim 1, characterized in that it contains about 1 to 30 weight fractions of binder per 100 weight fractions of pigment particles.

7. The coating element according to claim 1, characterized in that the crust layer comprises pigment particles that are bound to one another through a cross-linked binder, forming a dense film that surrounds the inner part.

8. The coating element according to claim 1, characterized in containing additives that affect its electrical or optical properties.

9. The coating element according to claim 1, characterized in that its particle granule is essentially spherical and its diameter is about 1 to 100 mm.

10. The coating element according to claim 1, characterized in that the composition of the surface layer of the particle granule corresponds to that of the surface layer of the coating before the mechanical treatment that it is subjected to.

11. A method for preparing a coating element, according to which an aqueous slurry is prepared from pigment particles, a binder, and additives, which slurry is dried, characterized in that the aqueous slurry is dried in conditions, where the pigment particles are bound to one another through a binding agent, forming rotationally symmetrical particle granules that comprise an inner part and a crust part, the density of the inner part being about 10 to 90% of the density of the crust part.

12. The method according to claim 11, characterized in that fine-grained drops are formed from the aqueous slurry, and dried separately from one another.

13. The method according to claim 12, characterized in that drops are formed, the size of which is about 1 to 300 mm.

14. The method according to claim 11, characterized in that the aqueous slurry is dried by spray drying.

15. The method according to claim 11, characterized in that the dry content of the aqueous slurry is about 40 to 95% by weight.

16. A coated fibrous web comprising a web formed from a lignocellulose-based raw material, a coating layer containing a pigment and a binder being formed at least onto one surface of the web, characterized in that the coating consists of interconnected cells formed from flattened coating elements, the individual cells comprising a layer of pigment/binder, its density being about 10 to 90% of the density of the crust part.

17. The coated fibrous web according to claim 16, characterized in its coating comprising, on the average, 1 to 10 superimposed layers of pigment cells.

18. The coated fibrous web according to claim 16, characterized in that the coating consists of a layer of coating elements that is mechanically treated, in which layer the originally essentially rotationally symmetrical elements have been flattened under the effect of pressure and/or temperature to form a smooth layer.

19. The coated fibrous web according to claim 18, characterized in that the surface part of the coating consists of the fine-grained and binder-containing surface parts of the mechanically treated elements.

20. The coated fibrous web according to claim 18, characterized in that the inner part of the coating mainly consists of the porous inner parts of the mechanically treated elements.

21. The coated fibrous web according to claim 16, characterized in that the elements that form the surface part of the coating contain additives that affect its electrical or optical properties.

22. A method for coating a fibrous web, according to which a coating colour containing particle granules is spread at least onto one surface of the fibrous web, a coating layer that covers the surface of the fibrous web being formed from the coating colour, characterized by using particle granules, which are essentially rotationally symmetrical and which comprise an inner part and a crust part, the density of the inner part being about 10 to 90% of the density of the crust part, and subjecting the web coated with the particle granule-containing coating colour to mechanical treatment to at least partially flatten the granules.

23. The method according to claim 22, characterized in that in connection with the application of the coating slip, a binder such as latex emulsion is added.

24. The method according to claim 22, characterized in that linear pressure induced by the nip between rotating rolls is exerted on the web coated with the particle granules.

25. The method according to claim 24, characterized in that the pressure exerted on the web coated with the elements is selected so that it is sufficient for flattening the elements but does not cause an essential decrease in the bulk of the fibrous structure of the web.

26. The method according to claim 25, characterized in that the nip that induces the pressure is formed from two rolls, of which at least one is heated.

27. The coating element according to claim 1, wherein the pore volume of the inner part is about 30 volume-%.

28. The coating element according to claim 1, wherein the coating element contains about 2 to 20 weight fractions of binder per 100 weight fractions of pigment particles.

29. The coating element according to claim 1, wherein the particle granule diameter is about 5 to 50 mm.

30. The method according to claim 12, wherein the size of the drops is about 5 to 100 mm.

31. The method according to claim 30, wherein the size of the drops is 50 mm maximum.

32. The method according to claim 11, wherein the dry content of the aqueous slurry is about 50 to 90% by weight.

\* \* \* \* \*